(12) United States Patent
Criswell et al.

(10) Patent No.: US 7,168,599 B1
(45) Date of Patent: Jan. 30, 2007

(54) WATER-HANDLING SYSTEM

(76) Inventors: Richard Criswell, 8744 Harvest Valley Ave, Las Vegas, NV (US) 89129-7682; Kenneth H. Gardner, 3645 W. Oquendo Rd., Suite 400, Las Vegas, NV (US) 89118

( * ) Notice: Subject to any disclaimer, the term of this patent is extended or adjusted under 35 U.S.C. 154(b) by 507 days.

(21) Appl. No.: 10/800,605

(22) Filed: Mar. 16, 2004

(51) Int. Cl.
*B60P 3/22* (2006.01)

(52) U.S. Cl. .................. 222/608; 222/142.3; 414/490

(58) Field of Classification Search ............... 222/608, 222/175, 610, 614, 618–621, 628, 185.1, 222/142.2, 142.3, 165; 414/343, 421, 534, 414/535, 603, 612, 690, 698; 312/72, 247
See application file for complete search history.

(56) References Cited

U.S. PATENT DOCUMENTS

| 5,154,317 | A | * | 10/1992 | Roppolo, III | 222/66 |
| 5,406,996 | A | * | 4/1995 | Wagner et al. | 141/364 |
| 5,425,614 | A | * | 6/1995 | Perussi et al. | 414/422 |
| 5,638,991 | A | * | 6/1997 | Todden et al. | 222/113 |
| 5,833,096 | A | * | 11/1998 | Ohu | 222/146.1 |
| 5,846,043 | A | * | 12/1998 | Spath | 414/343 |
| 6,056,154 | A | * | 5/2000 | Fowler | 222/1 |
| 6,732,885 | B2 | * | 5/2004 | Mathues | 222/1 |
| 6,868,986 | B1 | * | 3/2005 | Arnold | 222/66 |
| 2004/0265104 | A1 | * | 12/2004 | Davis, Jr. | 414/490 |

* cited by examiner

*Primary Examiner*—Lien M. Ngo
(74) *Attorney, Agent, or Firm*—Allen A. Dicke, Jr.

(57) ABSTRACT

A platform receives at least two water bottles. A handtruck is configured to engage under a water bottle on the platform and carry it to the dispensing cabinet. In the handtruck, the water bottle is tilted so that the lowest corner of the bottle is directly below its neck. The handtruck engages and locks into the cabinet with the water bottle in proper, tilted position. A suction tube is dropped straight down into the bottle so that it reaches the lowest corner of the bottle. The suction tube carries a pump and discharge spout so that actuation of the pump causes dispensing of water.

20 Claims, 3 Drawing Sheets

WATER-HANDLING SYSTEM

FIELD OF THE INVENTION

This invention is directed to a water-handling system where water is delivered in bottles. A handtruck moves the bottles from storage into a dispensing cabinet. In the cabinet, the handtruck holds the water bottle in position, and the suction tube of a pump is lowered into the water bottle for the pumping and dispensing of water.

BACKGROUND OF THE INVENTION

Many homes and businesses receive drinking water in bottles, which bottles range in size up to 5 gallons. These bottles are placed in dispensers so that the persons in the area of the dispenser can receive the bottled water. Many persons believe that the bottled water is more healthy, more pure or better tasting than the tap water. The question of taste or wholesomeness of bottled water with respect to tap water is personal opinion and a function of the quality of the two different supplies. This taste and quality question brings about the desire or need for providing the bottled water.

The bottled water supply company leaves these full water bottles in a convenient storage area designated by the user, who must then move the full water bottle to the dispensing location. Usually, the user must pick up the bottle and load it into a dispenser. This is hard work for some, and there is always the danger of spilling the water. A more convenient water-handling system, including moving of the full water bottle and placing it into a position where dispensing can be achieved is desirable.

BRIEF SUMMARY OF THE INVENTION

In order to aid in the understanding of this invention, it can be stated in essentially summary form that it is directed to a water-handling system which includes a platform upon which water bottles are placed. The system includes a handtruck which can be manipulated to lift the water bottle, transport it and insert it into the dispensing cabinet. The dispensing cabinet has a pump with a suction tube in the bottle to withdraw and dispense water therefrom.

It is, thus, a purpose and advantage of this invention to provide a water-handling system in which the requirements of physically lifting and positioning a water bottle for the dispensing of water therefrom are greatly facilitated.

It is another purpose and advantage of this invention to provide a water-handling system which includes a handtruck which can pick up a full water bottle from a storage location and transmit it to the dispensing cabinet in a position where the pump suction tube can be inserted into the bottle.

It is a further purpose and advantage of this invention to provide a water-handling system where the bottle is retained at an angular position so that the pump suction tube can be inserted therein to reach the bottom corner of the bottle in order to dispense a maximum amount of water therefrom.

It is a further purpose and advantage of this invention to provide a water-handling system in which the user can pick up a full water bottle with a handtruck and handtruck that bottle into the dispensing cabinet in a position so that the suction tube of the pump can be inserted down into the water bottle to take water therefrom.

Other purposes and advantages of this invention will be noted from the study of the following portion of the specification, the claims and the attached drawings.

DESCRIPTION OF THE PREFERRED EMBODIMENTS

Figure 1:
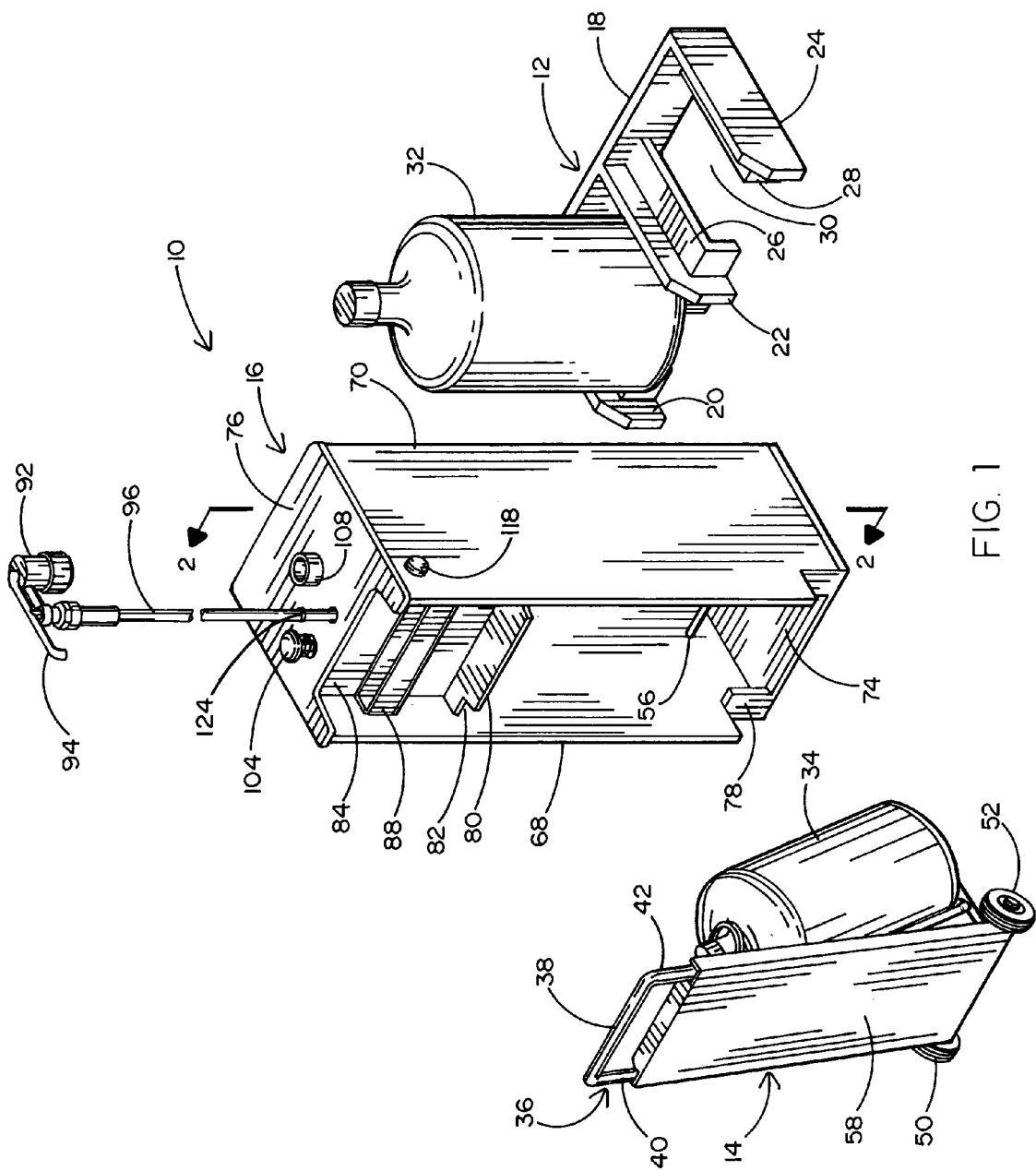
FIG. 1 is an isometric view of the water-handling system of this invention, showing the handtruck with a full water bottle, the dispensing cabinet and a platform with the water bottle therein.

The water-handling system 10 is shown in FIG. 1 as having three principal parts: platform 12, handtruck 14 and cabinet 16.

The platform 12 has a back wall 18 to which are secured three dividers 20, 22, and 24. A pair of supports is provided between each pair of dividers. Supports 26 and 28 are positioned between dividers 22 and 24. A similar pair of supports is provided between the dividers 20 and 22. These supports have a space 30 therebetween. The dividers are spaced and the supports are positioned so that a water bottle 32 can be rested on the supports between the dividers 20 and 22. A similar water bottle 34, shown in FIG. 1 as being carried by handtruck 14, can be positioned on supports 26 and 28 between dividers 22 and 24. It is on this platform that the user stores empty bottles and the deliverer of water bottles places the newly received bottles in the customer's premises.

Handtruck 14 has a U-shaped main frame 36 which has a crossways handle 38 and two uprights 40 and 42. The uprights have a bend 44 (see FIG. 2) of a specific angle, hereinafter described. The uprights extend angularly downward to shelf 46. The shelf is part of the main frame 36, and both are preferably formed of bent metallic tubing. The shelf may be U-shaped with its closing to the right in FIG. 2. The width of the shelf is such that it fits into the space 30 without engagement on the side supports 26 and 28. The lower part of the uprights below bend 44 is attached to the shelf at a right angle. Attachment is preferably by means of welding.

The lower back end of the shelf carries an axle 48 upon which are mounted rotating wheels 50 and 52. The open end of the U-shaped shelf extends back of the uprights so that the axle is directly below the upper part of the main frame when the handtruck is in its rest position shown in FIG. 2. The handtruck has a crossbar 54 on the underside of its U-shaped shelf. This crossbar is positioned so that it engages over cabinet crossbar 56 when in its rest position. Crossbar 56 is secured to the cabinet sidewalls. Cover plate 58 is mounted on the outside of the main frame in its upper part and against the back of axle 48 at its lower end. The axle is in line with the upper part of the main frame, as seen in FIG. 2.

Figure 2:
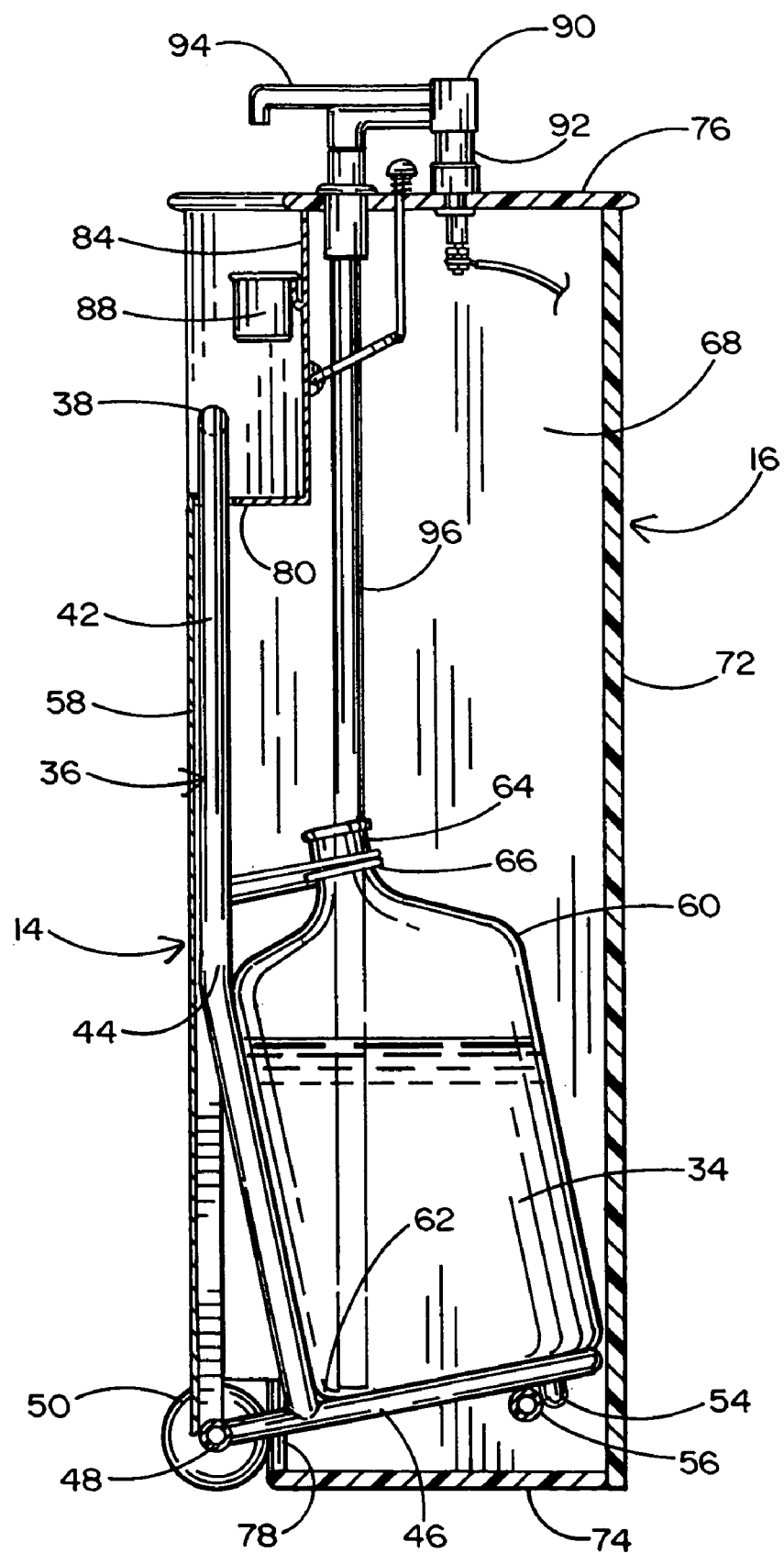
FIG. 2 is an enlarged section taken along the line 2—2 of FIG. 1, with the handtruck and water bottle in dispensing position.

The rest position of the handtruck in the cabinet is shown in FIG. 2, wherein the upper part of the main frame and the cover plate 58 are upright. In this position, the shelf 46 is engaged over the top of cabinet crossbar 56. The lower part of the uprights and the shelf are secured at a right angle with respect to each other. The height from the shelf to the bend 44 is at least equal to the height to the shoulder of water bottle 34. The angle of repose of the bottle is such that a line through the lower corner 62 and the neck 64 of the bottle is upright or parallel to the upper part of the main frame and cover plate 58. This configuration is shown in FIG. 2.

Pivotable coil 66 is mounted on the main frame of the handtruck and is sized to loop over the neck 64 of the water bottle. This holds the water bottle in place during tilt up off platform 12 and during movement of the water bottle.

Cabinet 16 is an upright cabinet formed with left and right sidewalls 68 and 70, back 72, bottom 74 and top 76. The front is open. The bottom of the front is recessed with toe board 78 set back from the front edge of the sidewalls. The center of the toe board is notched to permit entry of the shelf 46 and the bottle 34. The recess of the toe board is sufficient so that, when the wheels engage against the toe board (see FIG. 2) the crossbar 54 engages over crossbar 56. This engagement retains the handtruck in position within the cabinet. In this position, the cover plate 58 is flush between the front edges of the sidewalls. Shelf 80 extends between the two sidewalls of the enclosure and has notches therein to clear the uprights of the handtruck. Notch 82 is seen in FIG. 1 to clear the upright 40. The handtruck can, thus, bring the water bottle 34 into the cabinet and retain it in a specific location within the cabinet.

Cabinet 16 has an interior front wall 84, which extends down from top 86 and between the sidewalls 68 and 70 and extends forward to become shelf 80. The front of the front wall 84 carries a laterally extending hook flange 86 upon which is hooked catch basin 88. The top 76 is notched back over the catch basin.

Figure 3:
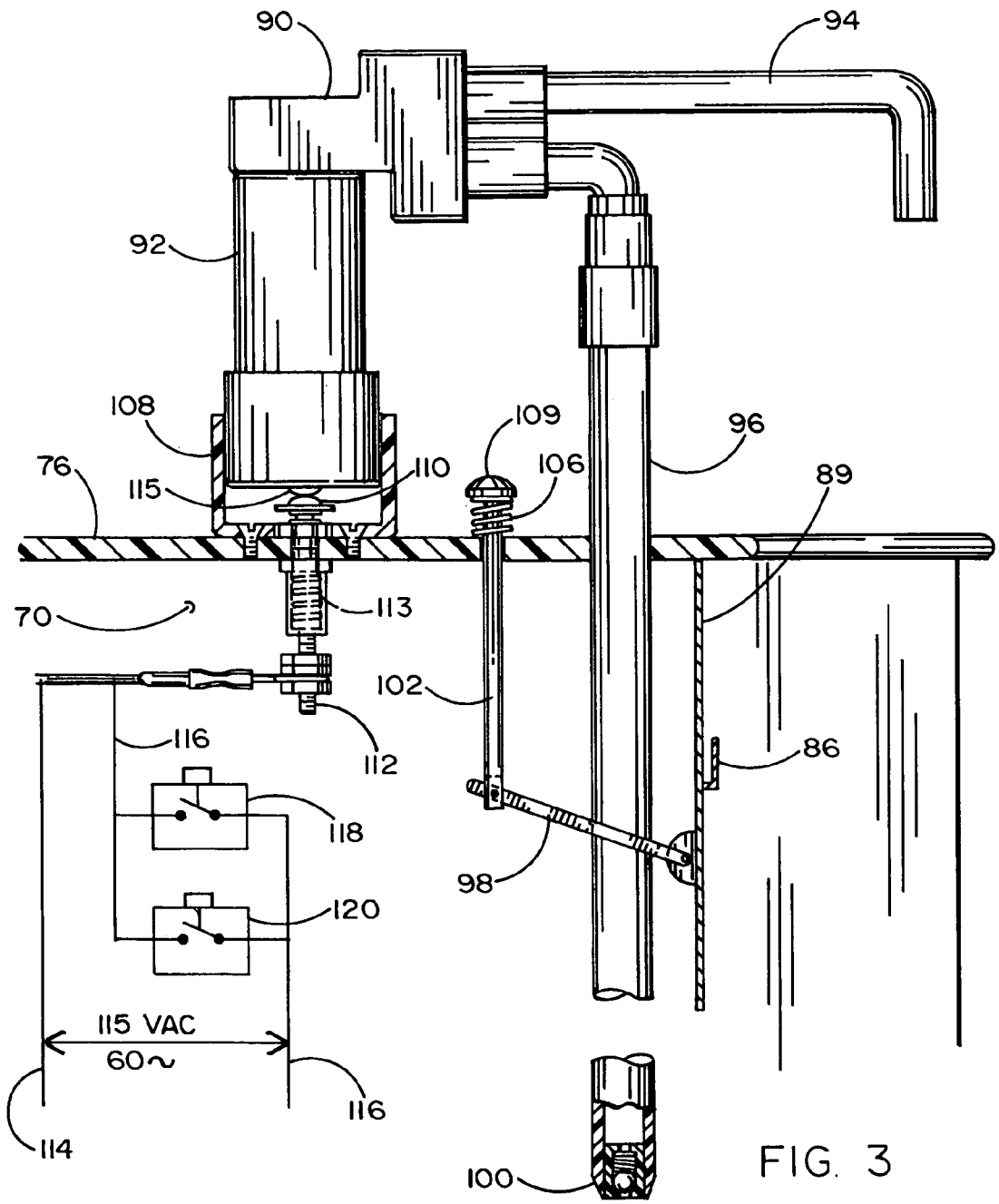
FIG. 3 is an enlarged side use, with parts broken away and parts taken in section, of the top of the cabinet, further including a schematic of the electrical system.

Pump 90 is driven by an electric motor 92 (FIG. 3). The pump has a discharge spout 94 which has a downwardly directed outlet over catch basin 88. Pump 90 has a suction tube which extends downward through an opening in top 76. It extends down through lock bar 98 and, at its lower end, has a check valve 100. The check valve is configured to permit upward flow and prevent downward flow through the suction tube 96.

Lock 98 is pivoted on the back of interior wall 87. Operating handle 102 is pivoted to the outer end of lock bar 98 and extends upward through top 76 to terminate in cap 104. Compression spring 106 is positioned between cap 104 and top 76 to resiliently urge the operating handle 102 and lock bar 98 in the upward direction. Suction tube 96 passes through a hole in lock bar 98. the hole is sized so that, when the lock bar is lowered from the position shown in FIG. 3, the tube is free to move up and down. When the spring 106 moves the operating handle and lock bar up to the position shown in FIG. 3, the lock bar binds on the exterior of the suction tube 96. Thus, cap 104 can be manually depressed and the suction tube raised to the position shown in FIG. 1. In this position it is retained out of the water bottle 34 so that the water bottle may be removed and replaced. When a new water bottle is put in place, the suction tube is manually lowered until registration with the bottom of the bottle is felt. The pump 90, motor 92 and outlet spout 94 are all mounted on the suction tube and are raised and lowered therewith.

The motor 92 is connected into its power circuit when its lower end is moved down into socket 108. The motor has two separate electrical contacts on its lower end, and there are two corresponding contacts within the socket. The cabinet contacts are spring-mounted, and extend into the interior of the cabinet by way of terminal stud 112. A compression spring 113 in the terminal housing urges the contact 110 upward to make contact to the contact 115 on the bottom of the motor 92. Contact 110 is seen on the top of terminal stud 112. There is a similar spring-loaded contact and a similar terminal stud beyond those illustrated in FIG. 3. The terminal stud 112 is connected to power line 114. The other power line 116 is connected through parallel switches 118 and 120 to the other contact in the socket. These switches 118 and 120 are respectively positioned on the left and right sidewalls adjacent the top of the cabinet. Switch 118 is shown in FIG. 1. Switch 120 is on the opposite side in a similar location. Two switches aid in serving right- and left-handed users. While a 115 volt system is illustrated, it is clear that a higher or lower voltage system could be employed. As an alternative to an electric pump, a manual pump can be utilized.

Assuming that the water-handling system is in the condition shown in FIG. 1, a full bottle of water 34 has been picked up by the handtruck 14. It is wheeled into position in the cabinet and, when the handle is released to the upright position, crossbar 54 engages over crossbar 56 to retain the handtruck and water bottle in place. Now, the suction tube is lowered from the raised position of FIG. 1 to the lowered position of FIG. 2 wherein the lower end of the suction tube is in the lower corner of the water bottle. The pump is operated by actuation of either switches 118 or 120, and water is dispensed out of the spout 94. Any dripping resulting from improper filling of a cup is caught in basin 88. The basin 88 can be lifted out and dumped, as required. Dispensing continues as required. The check valve 100 prevents the pump from losing its prime, and water is always available at the pump for instant dispensing.

When the bottle 34 is empty, the pump, motor, outlet spout and suction tube are raised by releasing lock bar 98 and lifting the entire pumping assembly until the indicator mark 124 appears, signifying that the lower end of the suction tube with its check valve 100 is above the neck of the bottle. Now the handtruck can be tilted out with the bottle thereon. The empty bottle is dollied to the platform and manually placed on an empty platform stall. A full bottle is then picked up and trucked to the cabinet. Thus, water replacement is easily achieved without the lifting and inverting of full water bottles.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A water-handling system comprising:
    a platform configured to receive at least one water bottle standing on its base;
    a handtruck configured to engage upon a water bottle in said platform to remove the water bottle from said platform without lifting or other manual engagement of the water bottle;
    a cabinet configured to receive the water bottle and at least some of said handtruck, interengaging parts on said handtruck and in said cabinet to releaseably retain said handtruck with respect to said cabinet, and to releaseably retain the water bottle in a predetermined position in said cabinet;
    a pump supported by said cabinet, said pump having a suction tube, said cabinet retaining said suction tube in alignment with the neck opening of the water bottle when the water bottle is in its predetermined position so that said suction tube can be inserted into the water bottle through its neck when the water bottle is in its predetermined position so that said pump can pump water therefrom.

2. The water-handling system of claim 1 wherein said platform has separated supports therein, said supports being sized and positioned to support a water bottle with a space beneath the water bottle between said supports;

said handtruck having a shelf thereon sized to extend between said supports to engage under the water bottle so when said handtruck has its shelf positioned under the water bottle between said supports, said handtruck can be tilted to lift the water bottle off of said platform so that it is supported by said handtruck.

3. The water-handling system of claim 2 wherein said handtruck has an upright direction and said shelf is at an angle with respect to said upright direction so that a water bottle on said handtruck is tilted with respect to said upright direction.

4. The water-handling system of claim 3 wherein said shelf on said handtruck is at an angle with respect to the upright direction such that when said handtruck is positioned in the upright direction, the neck opening of the bottle is substantially over the lowest corner of the bottle.

5. The water-handling system of claim 4 wherein said handtruck is in the upright position when said handtruck is engaged in said cabinet and said suction tube on said pump is positioned to extend down through the neck of the bottle to its lowest corner.

6. The water-handling system of claim 2 wherein said handtruck has a frame, with a portion of said frame being in an upright position when said handtruck is engaged in said cabinet and a portion of said frame being at an angle with respect thereto so that the water bottle is in a tilted position when said handtruck is engaged in said cabinet.

7. The water-handling system of claim 6 wherein said suction tube is a substantially straight suction tube, said suction tube being movable along its length up and down with respect to said cabinet, said suction tube being positioned so that it can be in a first, raised position for the insertion and removal of said handtruck with respect to said cabinet and can be lowered to a second position wherein said suction tube is inserted into a water bottle mounted in a tilted position on said handtruck.

8. The water-handling system of claim 1 wherein said suction tube has a pump attached to its upper end and has a check valve at its lower end so that said pump can pump water out of the bottle on said handtruck in said cabinet.

9. The water-handling system of claim 8 wherein said pump has an electric motor driving said pump.

10. The water-handling system of claim 9 wherein there are electric contacts on said pump motor and there are electric contacts on said cabinet, said electric contacts being positioned to be in electrical contact when said suction tube is in it second position.

11. The water-handling system of claim 10 wherein there is an electric circuit on said cabinet connected to said motor contacts, said electric circuit including at least one switch so that actuation of said switch energizes said motor when said suction tube is in its second position with said motor contact's engagement with said cabinet contacts.

12. The water-handling system of claim 1 wherein said cabinet has sides and an open front, said handtruck being configured to place a water bottle supported thereon into said cabinet and to form a closure for at least part of said open front of said cabinet.

13. The water-handling system of claim 12 wherein there is interlocking structure between said handtruck and said cabinet to releasably retain said handtruck with respect to said cabinet with a water bottle within said cabinet.

14. The water-handling system of claim 13 wherein said releasable engagement structure comprises a crossbar within said cabinet between said sidewalls and a crossbar under said shelf of said handtruck so that said shelf crossbar engages over said crossbar in said cabinet.

15. A water-handling system comprising:

a platform configured to support at least one water bottle;

a handtruck configured to engage a water bottle on said platform and remove it from said platform;

a cabinet, said cabinet having an open front, said cabinet being configured to receive a water bottle on said handtruck and said handtruck being configured to substantially enclose the front of said cabinet so that a water bottle can be removed from said platform and placed in dispensing position within said cabinet.

16. The water-handling system of claim 15 wherein there is engagement structure between said handtruck and said cabinet to releasably retain said handtruck with respect to said cabinet with the water bottle in dispensing position.

17. The water-handling system of claim 15 wherein said handtruck is a 2-wheel handtruck.

18. The water-handling system of claim 16 wherein said handtruck is in an upright position when said handtruck is engaged in said cabinet and said handtruck is configured to support the water bottle in a tilted position so that the neck of the water bottle is over the lowest corner of the water bottle, said cabinet having a dispensing tube which is aligned with the water bottle so that said dispensing tube can be moved from a raised position where it is above said water bottle to a lowered position where said dispensing tube extends through the neck of the bottle down to a lower corner within the bottle; and further including a pump on said dispensing tube so that water can be dispensed from said bottle by actuation of said pump.

19. The water-handling system of claim 18 wherein said pump is an electric motor driven pump and there is an energizing circuit connected to said electric motor, said circuit including contacts on said cabinet and contacts mounted with respect to said motor, said contacts being electrically connected when said dispensing tube is in its lowered position, and a switch connected to said contacts for controlling power to said electric pump to control the dispensing of water.

20. The water-handling system of claim 18 wherein said dispensing tube is a substantially rigid suction tube, said suction tube having a foot check valve therein to prevent return of water from said pump into the bottle or cabinet interior, and said cabinet has a suction tube engaging lock, said lock being releasable to releasably retain said suction tube in its raised position during placement of a new water bottle into said cabinet.

* * * * *